(12) United States Patent
Kathiara et al.

(10) Patent No.: US 10,693,883 B2
(45) Date of Patent: Jun. 23, 2020

(54) TECHNOLOGIES FOR INTEGRATING AND SANDBOXING WEB RESOURCES

(71) Applicant: salesforce.com, inc., San Francisco, CA (US)

(72) Inventors: Jinal Kathiara, San Francisco, CA (US); Gursev Singh Kalra, San Francisco, CA (US); Dylan Ayrey, San Francisco, CA (US); Hormazd Billimoria, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 266 days.

(21) Appl. No.: 15/876,437

(22) Filed: Jan. 22, 2018

(65) Prior Publication Data

US 2019/0230090 A1   Jul. 25, 2019

(51) Int. Cl.
| | |
|---|---|
| G06F 21/62 | (2013.01) |
| H04L 29/06 | (2006.01) |
| H04L 9/30 | (2006.01) |
| H04L 9/32 | (2006.01) |
| G06F 9/54 | (2006.01) |
| G06F 21/53 | (2013.01) |
| G06F 16/25 | (2019.01) |
| H04L 29/08 | (2006.01) |

(52) U.S. Cl.
CPC .......... *H04L 63/102* (2013.01); *G06F 9/548* (2013.01); *G06F 16/254* (2019.01); *G06F 21/53* (2013.01); *G06F 21/6218* (2013.01); *H04L 9/30* (2013.01); *H04L 9/3242* (2013.01); *H04L 9/3247* (2013.01); *H04L 63/10* (2013.01); *H04L 67/02* (2013.01); *H04L 67/1004* (2013.01); *G06F 2221/033* (2013.01); *G06F 2221/2113* (2013.01); *H04L 67/2842* (2013.01)

(58) Field of Classification Search
CPC ..... H04L 63/10; H04L 67/02; G06F 21/6218; G06F 21/53
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |

(Continued)

*Primary Examiner* — Ellen Tran
(74) *Attorney, Agent, or Firm* — Schwabe Williamson & Wyatt

(57) ABSTRACT

Systems, methods, and computer-readable media for integrating web resources are provided. A Resource Provider Proxy Service (RPPS) may download and cache whitelisted resources from a third party service (3PS). Once whitelisted resources are downloaded to the RPPS from the 3PS, a secure endpoint service may expose the resources to applications running on user systems. The resources served to the user system applications may be virtually isolated from one another in separate domains using a sandboxing framework. Other embodiments may be described and/or claimed.

15 Claims, 7 Drawing Sheets

(56) References Cited

U.S. PATENT DOCUMENTS

| | | |
|---|---|---|
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B2 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,959,067 B1 * | 2/2015 | Patiejunas ............ G06F 16/2228 707/696 |
| 10,382,445 B1 * | 8/2019 | Mantel .................. H04L 63/102 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |

(56) References Cited

U.S. PATENT DOCUMENTS

| | | |
|---|---|---|
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jackobson et al. |
| 2016/0048844 A1* | 2/2016 | Vogt, Jr. ............... G06Q 30/018 705/317 |
| 2016/0080368 A1* | 3/2016 | Heurich .................. H04L 63/08 713/156 |

\* cited by examiner

TECHNOLOGIES FOR INTEGRATING AND SANDBOXING WEB RESOURCES

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to database systems and computer networks, and in particular to systems and methods for integrating multiple web resources into a single object or document.

BACKGROUND

In multi-tenant database systems, customer organizations (also referred to as "tenants", "orgs", "tenant orgs", "tenants/orgs", or the like) may share database resources in one logical database. The databases themselves are typically shared, and each tenant is typically associated with an organization identifier (org ID) column or field that may be used to identify rows or records belonging to each tenant. Users of a multi-tenant database system (e.g., a tenant/organization (org) or developers associated with the tenant) may develop applications or platforms that interact or integrate with the multi-tenant database system and utilize data from an associated tenant space. The applications/platforms may obtain data from the associated tenant space to render/display visual representations of relevant tenant data. In some cases, the applications/platforms may utilize tenant data for interacting with clients, and may include program code or script(s) that call an application programming interface (API) to obtain and manipulate data, create and execute the sending of various messages based on various triggering events, and/or other like functions.

Some orgs may provide multiple resources, applications, or platforms that correspond with different services or products. At least some of these orgs may wish to integrate multiple resources or applications (or micro-applications) into a same web object (e.g., a webpage, a web application, etc.) even though these resources and/or applications may be hosted by multiple separate servers. In addition, some orgs may wish to integrate content items served from various content providers or partner companies separate from the org into the single web object or application. Examples of such resources/applications may include social network widgets, advertising network content, or the like. As tenants/orgs increasingly develop applications that rely on multiple content and resource sources, webpage sizes continues to rise and content/resources may be served to user systems that are not fully controlled by the multi-tenant database system. This may cause security and performance related issues to arise.

The conventional solution for incorporating multiple webpages into a single web object is to use the hypertext markup language (HTML) inline frames (iFrame). iFrames allow a browser window to be split into multiple segments where each segment can display different documents or resources from the same or different servers. This may allow a main window/iFrame running a main application to be isolated from third party code running in other secondary windows/iFrames. Additionally, the third party code may be prevented from accessing main window domain session cookies and session information. iFrames also have a sandbox attribute that allows a developer to define restrictions for the type of content that may be displayed in an iFrame. However, integration is difficult when using iFrames because each frame runs in its own context and requires an API to allow different iFrames (and content therein) to communicate with one another. Furthermore, the use of iFrames may also reduce performance of code execution and graphics rendering.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
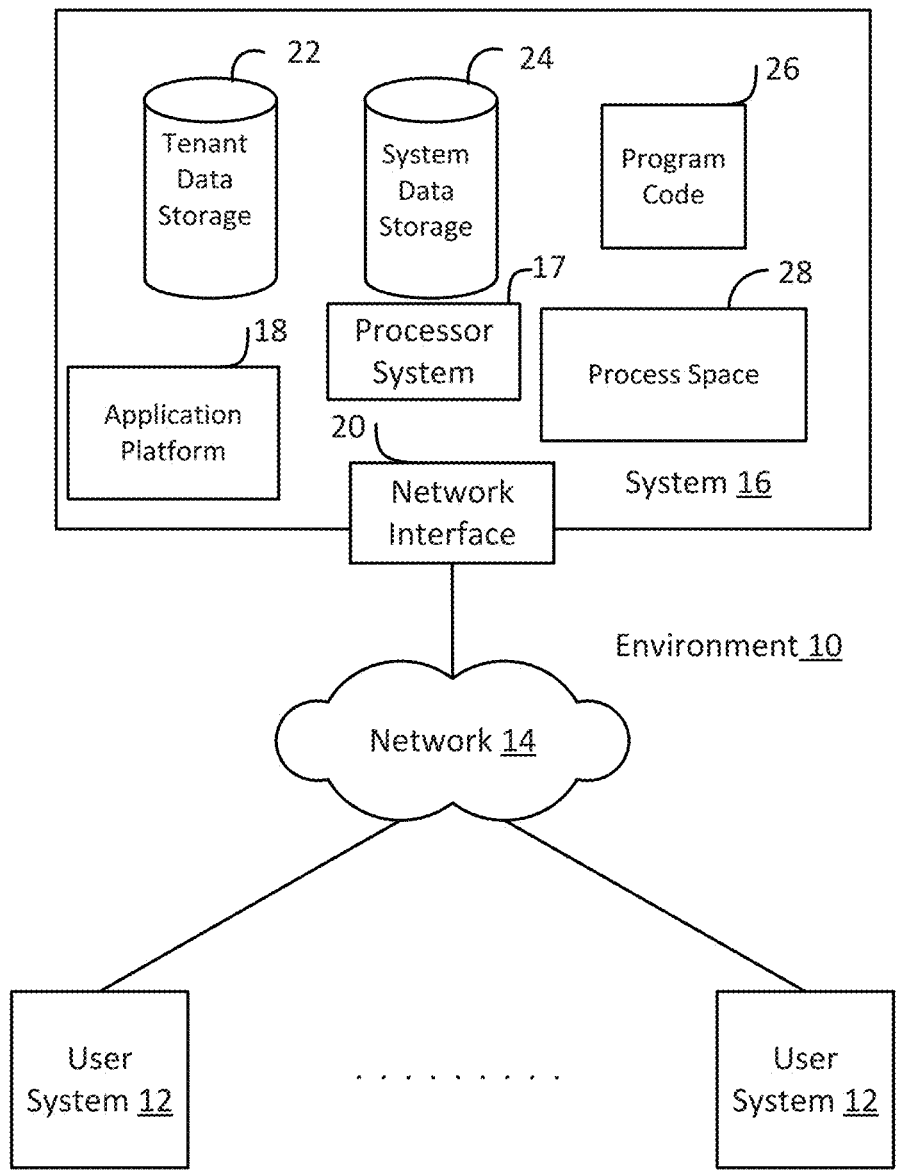
FIG. 1A shows a block diagram of an example environment in which an on-demand database service can be used according to some implementations.

Embodiments discussed herein provide mechanisms to integrate multiple web resources or documents into a single browser window. Various embodiments provide for the integration of web resources into a single browser window without using hypertext markup language (HTML) inline frames (iFrames). In embodiments, a Resource Provider Proxy Service (RPPS) may download and cache whitelisted resources from a third party service (3PS). In some embodiments, the RPPS may be a content delivery network (CDN) servlet or virtual CDN proxy server running on a web server, an application (app) server, or other like device(s). Once whitelisted resources are downloaded to the RPPS from the 3PS, a secure endpoint service may serve/expose the resources to user systems running web apps. In this way, the web apps can have sandboxed resources using a content security policy (CSP), which only allows specified domains to be connected to the RPPS. Since the CSP restricts resources to be consumed only from the specified domains, the embodiments allow orgs/developers to control the particular content that can be run inside the web apps. Furthermore, little to no browser changes are required to implement this aspect of the embodiments since modern browser specifications impose CSP restrictions and make sure that only specified domain resources are consumed. When 3PS resources are loaded on the user system, the resources may be virtually isolated from one another in separate domains using a sandboxing framework.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring of the disclosed implementations. Other implementations and applications are also possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. In some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations may refer to the term "tenant," which may include a group of users who share common access with specific privileges to a software instance. A multi-tenant architecture, such as those discussed herein, may provide a tenant with a dedicated share of a software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

As used herein, the term an "instance" may refer to a concrete occurrence of an object, which may occur, for example, during execution of program code, and the terms "instantiate", "instantiation", and the like may refer to the creation of an instance. As used herein, an "object" may refer to an instance of a class, and may include one or more variables, data structures, functions, methods, database elements, etc. and may have a memory location and a value that are referenced by an identifier.

As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, hardware time or usage, electrical power, input/output operations, ports or network sockets, channel/link allocation, throughput, and/or the like. As used herein, the term "network resource" may refer to computing resources that are accessible by computer devices via a communications network. As used herein, the term "web resource" or the like may refer to any resource that is accessible or retrievable from a remote system or device. Examples of web resources may include any hardware/computing resources, network resources, software resources, and resources created or developed for web/distributed applications. As used herein, the term "web resource" may refer to both the resource itself and the address (e.g., uniform resource locator (URL)) used to access/retrieve the web resource.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In embodiments, the tenant data storage 22, the system data storage 24, and/or some other data store (not shown) may include Extract-Load-Transform (ELT) data or Extract-Transform-Load (ETL) data, which may be raw data extracted from various sources and normalized (e.g., indexed, partitioned, augmented, canonicalized, etc.) for analysis and other transformations. In some embodiments, the raw data may be loaded into the tenant data storage 22, the system data storage 24, and/or some other data store (not shown) and stored as key-value pairs, which may allow the data to be stored in a mostly native form without requiring substantial normalization or formatting.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16. The applications of the application platform 18 may be developed with server-side programming languages, such as PHP, Java and/or Java Server Pages (JSP), Node.js, ASP.NET, and/or any other like technology that renders HTML. The applications may be built using a platform-specific and/or proprietary development tool and/or programming languages, such as Salesforce® Apex and/or the like.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a local area network (LAN), a wireless LAN (WLAN), wide area network (WAN), telephone network, wireless network, cellular network, point-to-point network, star network, token ring network, hub network, or other appropriate configuration including proprietary and/or enterprise networks, or combinations thereof. The network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol. The network 14 may comprise one or more network elements, each of which may include one or more processors, communications systems (e.g., including network interface controllers, one or more transmitters/receivers connected to one or more antennas, etc.), and computer readable media. Examples of such network elements may include wireless APs (WAPs), a home/business server (with or without radio frequency (RF) communications circuitry), routers, switches, hubs, radio beacons, (macro or small-cell) base stations, servers (e.g., stand-alone, rack-mounted, blade, etc.), and/or any other like devices/systems. Connection to the network 14 may be via a wired or a wireless connection using one or more of the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. Connection to the network 14 may require that the various devices and network elements execute software routines which enable, for example, the seven layers of the open systems interconnection (OSI) model of computer networking or equivalent in a wireless network.

The user systems 12 can communicate with system 16 using TCP/IP and, at a higher network level, other common Internet protocols to communicate, such as Hypertext Transfer Protocol (HTTP), File Transfer Protocol (FTP), Andrew File System (AFS), Wireless Application Protocol (WAP), Session Initiation Protocol (SIP) with Real-Time Transport Protocol (RTP or Secure RTP (SRTP), WebSocket protocol, etc. In an example where HTTP is used, each user system 12 can include an HTTP client commonly referred to as a "web browser" or simply a "browser" for sending and receiving HTTP signals to and from an HTTP server (also referred to as a "web server") of the system 16. In this example, each user system 12 may send and receive HTTP messages where a header of each message includes various operating parameters and the body of the such messages may include HTML, Extensible Markup Language (XML), Java Script Object Notion (JSON), Cascading Stylesheets (CSS), JavaServer Pages (JSP), MessagePack™, Apache® Thrift, Abstract Syntax Notation One (ASN.1), Google® Protocol Buffers (protobuf), database objects, or some other like object(s)/document(s). Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device (e.g., Personal Data Assistants (PDAs), pagers, portable media player, etc.), a mobile cellular phone (for example, a "smartphone"), or any other WiFi-enabled device, WAP-enabled device, or other computing device capable of interfacing directly or indirectly to the Internet or other network (e.g., network 14). The terms "user system", "computing device", "computer system", or the like may be used interchangeably herein with one another and with the term "computer."

As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, and/or the like, to execute and render web applications allowing a user (for example, a subscriber of on-demand services provided by the system 16) of the user system 12 to access, process and view information, pages, interfaces, and applications available to it from the system 16 over the network 14. In other implementations, each user system 12 may operate a user (or third party) application designed to interact with applications of the application platform 18 allowing a user (for example, a subscriber of on-demand services provided by the system 16) of the user system 12 to access, process and view information, pages and applications available to it from the system 16 over the network 14. In some cases, an owner/operator of database system 16 may have pre-built the web or user applications for use by clients, customers, and/or agents of a tenant organization (org) to access a tenant space or enterprise social network of that tenant org. In some cases, developers associated with a tenant org may build custom application(s) for interacting with the tenant data. The user (or third party) application(s) may be native application(s) (e.g., executed and rendered in an application container) or hybrid application(s) (e.g., web applications being executed/rendered in an application container or skeleton). The user (or third party) application(s) may be platform-specific, or developed to operate on a particular type of user system 12 or a particular (hardware and/or software) configuration of a user system 12. The term "platform-specific" may refer to the platform implemented by the user system 12, the platform implemented by the database system 16, and/or a platform of a third party system.

In an example, the user systems 12 may implement web, user, or third party applications to request and obtain data from database system 16, and render graphical user interfaces (GUIs) in an application container or browser. In some implementations, the GUIs may include a data analytics GUI, such as Salesforce® Wave™ dashboard, which may provide visual representations of data residing in an enterprise cloud or in an on-demand services environment (e.g., a tenant space within database system 16). The GUIs may include one or more components (e.g., graphical control elements (GCEs), tabs, reports, dashboards, widgets, pages, etc.). Examples of such components may include audio/video calling components, messaging components (e.g., chat, instant messaging, short message service (SMS)/multimedia messaging service (MMS) messaging, emailing, etc.), and visualization components. The visualization components may enable a user of a user system 12 to select visualization parameters (also referred to as "lens parameters" or "filters") for displaying data from one or more datasets. A dataset may be a specific view or transformation of data from one or more data sources (e.g., a tenant space of database 22, etc.). The visualization parameters may include, for example, a selection of data or data type to display from one or more datasets; a particular graph, chart, or map in which to view the selected data; color schemes for the graphs/charts/maps; a position or orientation of the graphs/charts/maps within a particular GUI, etc. The graphs/charts/maps to be displayed may be referred to as a "lens" or a "dashboard". A lens may be a particular view of data from one or more datasets, and a dashboard may be a collection of lenses. In some implementations, a GUI may display lenses, dashboards, and/or control panels to alter or rearrange the lenses/dashboards. Furthermore, the various application(s) discussed herein may also enable the user system 12 to provide authentication credentials (e.g., user identifier (user id), password, personal identification number (PIN), digital certificates, etc.) to the database system 16 so that the database system 16 may authenticate the identity of a user of the user system 12.

The web, user, or third party application(s) discussed herein may be a software, program code, logic modules, application packages, etc. that are built using website development tools and/or programming languages, such as HTML, CSS, JavaScript, JQuery, and the like; and/or using platform-specific development tools and/or programming languages (e.g., Salesforce® Apex, Salesforce® Visualforce®, Salesforce® Lightning®, Salesforce® Wave™ Dashboard Designer, Salesforce® Force.com® IDE, Android® Studio™ integrated development environment (IDE), Apple® iOS® software development kit (SDK), etc.). Furthermore, such applications may utilize a suitable querying language to query and store information in an associated tenant space, such as Structure Query Language (SQL), object query language (OQL), Salesforce® OQL (SOQL), Salesforce® object search language (SOSL), Salesforce® analytics query language (SAQL), and/or other like query languages.

Each user system 12 typically includes an operating system (OS) to manage computer hardware and software resources, and provide common services for various applications. The OS may include one or more drivers and/or APIs that provide an interface to hardware devices thereby enabling the OS and applications to access hardware functions. In some embodiments, the OS may include middleware that may connect two or more separate applications or connect applications with underlying hardware components beyond those available from OS and/or the drivers/APIs. The OS may be a general purpose operating system or an operating system specifically written for and tailored to the user system 12.

Each user system 12 also typically includes one or more user input devices, such as a keyboard, a mouse, a trackball, a touch pad, a touch screen, a pen or stylus or the like, for interacting with a GUI provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

Figure 1B:
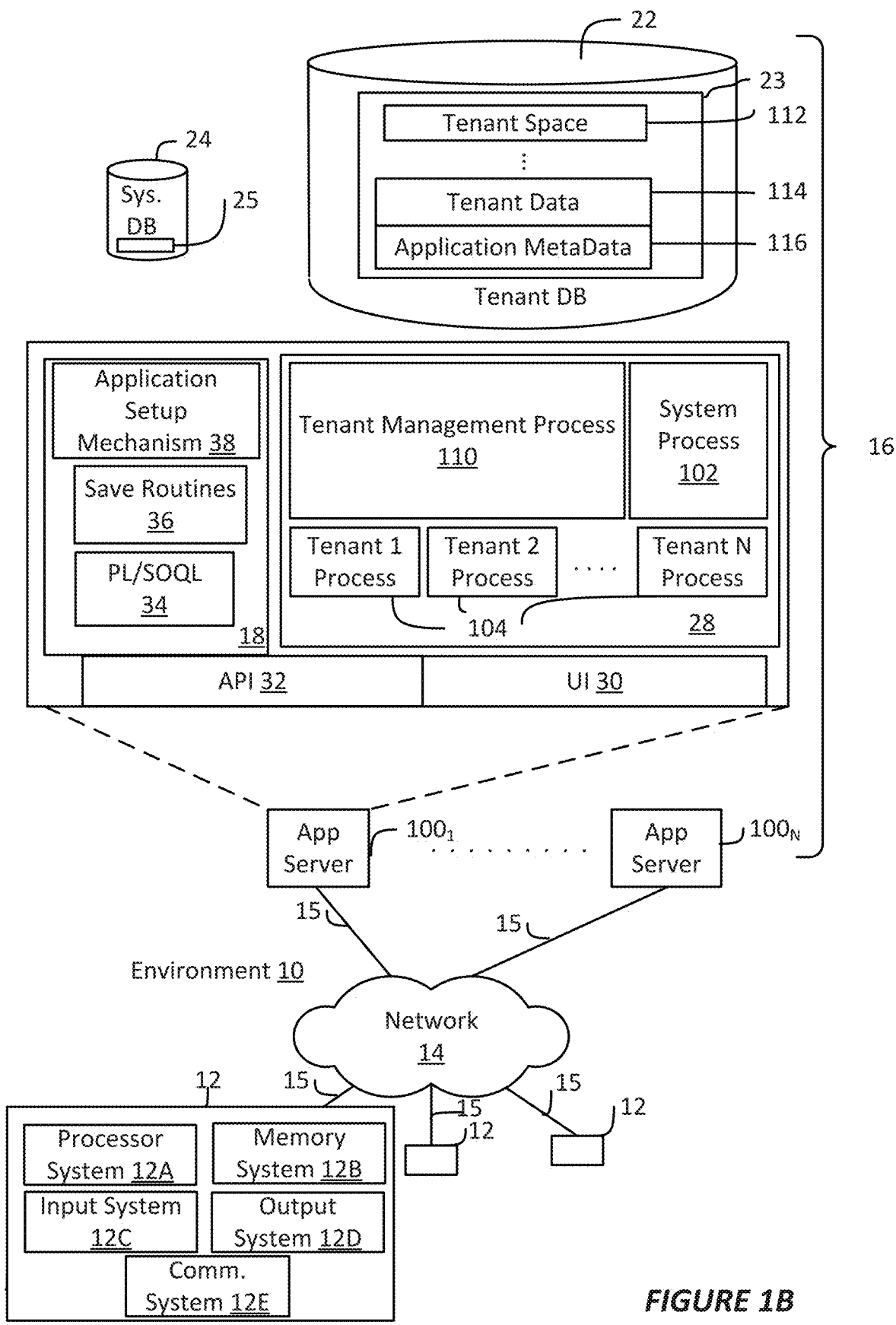
FIG. 1B shows a block diagram of example implementations of elements of FIG. 1A and example interconnections between these elements according to some implementations.

According to some implementations, each user system 12 and some or all of its components are operator-configurable using applications, such as a browser, including computer code executed using one or more central processing units (CPUs) and/or other like computer processing devices (see e.g., processor system 12B of FIG. 1B). Similarly, the system 16 (and additional instances of an MTS, where more than one is present) and all of its components can be operator-configurable using application(s) including computer code to run using the processor system 17, which may include one or more CPUs/processors. Examples of the processors/CPUs of processor system 17 may include one or multiple Intel Pentium® or Xeon® processors, one or more AMD Epyc® processors, or the like.

The system 16 includes tangible computer-readable media having non-transitory instructions stored thereon/in that are executable by or used to program a server (e.g., the app servers 100 or other servers discussed herein) or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, an output system 12D, and a communications system 12E.

The processor system 12A can include any suitable combination of one or more processors, such as one or more central processing units (CPUs) including single-core or multi-core processors (such as those discussed herein), one or more graphics processing units (GPUs), one or more field-programmable gate arrays (FPGAs), or any other electronic circuitry capable of executing program code and/or software modules to perform arithmetic, logical, and/or input/output operations. As examples, the processor system 12A may include Intel® Pentium® or Core™ based processor(s); Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); or the like.

The memory system 12B can include any suitable combination of one or more memory devices, such as volatile storage devices (e.g., random access memory (RAM), dynamic RAM (DRAM), etc.) and non-volatile memory device (e.g., read only memory (ROM), flash memory, etc.). The memory system 12B may store program code for various applications (such as the various application discussed herein) for carrying out the procedures, processes, methods, etc. of the embodiments discussed herein, as well as an operating system (OS) and one or more databases. The OS may manage computer hardware and software resources, and provide common services for the applications via one or more drivers and/or APIs that provide an interface to hardware devices thereby enabling the OS and applications to access hardware functions. The memory system 12B may also include middleware that may connect two or more separate applications or connect applications with underlying hardware components beyond those available from OS and/or the drivers/APIs. The OS may be a general-purpose operating system or an operating system specifically written for and tailored to the user system 12.

The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

The communications system 12E may include circuitry for communicating with a wireless network or wired network. Communications system 12E may be used to establish a link 15 (also referred to as "channel 15," 'networking layer tunnel 15," and the like) through which the user system 12 may communicate with the database system 16. Communications system 12E may include one or more processors (e.g., baseband processors, network interface controllers, etc.) that are dedicated to a particular wireless communication protocol (e.g., Wi-Fi and/or IEEE 802.11 protocols), a cellular communication protocol (e.g., Long Term Evolution (LTE) and the like), a wireless personal area network (WPAN) protocol (e.g., IEEE 802.15.4-802.15.5 protocols, Bluetooth or Bluetooth low energy (BLE), etc.), and/or a wired communication protocol (e.g., Ethernet, Fiber Distributed Data Interface (FDDI), Point-to-Point (PPP), etc.). The communications system 12E may also include hardware devices that enable communication with wireless/wired networks and/or other user systems 12 using modulated electromagnetic radiation through a solid or non-solid medium. Such hardware devices may include switches; filters; amplifiers; antenna elements; wires, ports/receptacles/jacks/sockets, and plugs; and the like to facilitate the communications over the air or through a wire by generating or otherwise producing radio waves to transmit data to one or more other devices, and converting received signals into usable information, such as digital data, which may be provided to one or more other components of user system 12. To communicate (e.g., transmit/receive) with the database system 16, the user system 12 using the communications system 12E may establish link 15 with network interface 20 of the database system 16.

In FIG. 1B, the network interface 20 is implemented as a set of HTTP application servers $100_1$-$100_N$. Each application server 100 (also referred to herein as an "app server", an "application programming interface (API) server", a "worker node", and/or the like) is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an API 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection 15. For example, one application server $100_1$ can be coupled via the network 14 (for example, the Internet), another application server $100_{N-1}$ can be coupled via a direct network link 15, and another application server $100_N$ can be coupled by yet a different network connection 15. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. In this regard, each application server 100 may be configured to perform various database functions (e.g., indexing, querying, etc.) as well as formatting obtained data (e.g., ELT data, ETL data, etc.) for various user interfaces to be rendered by the user systems 12. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. As used herein, a "database object", "data object", or the like may refer to any representation of information in a database that is in the form of an object or tuple, and may include variables, data structures, functions, methods, classes, database records, database fields, database entities, associations between data and database entities (also referred to as a "relation"), and the like. A "table" is one representation of a data object, and may be used herein to simplify the conceptual description of objects and custom objects according to some implementations. It should be understood that "table" and "data(base) object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
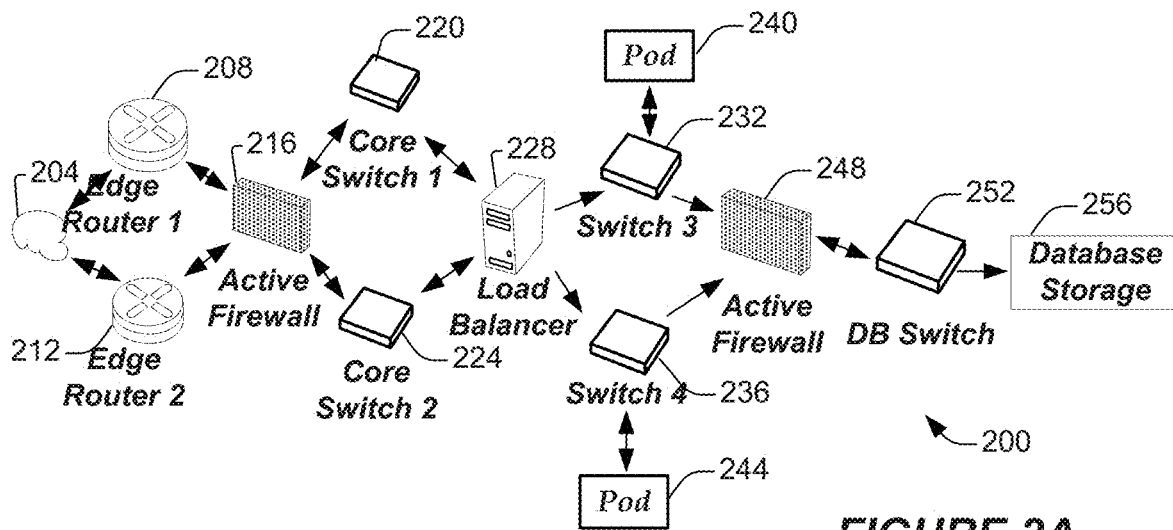
FIG. 2A shows a system diagram of example architectural components of an on-demand database service environment according to some implementations.

FIG. 2A shows a system diagram illustrating example architectural components of an on-demand database service environment 200 according to some implementations. A client machine communicably connected with the cloud 204, generally referring to one or more networks in combination, as described herein, can communicate with the on-demand database service environment 200 via one or more edge routers 208 and 212. A client machine can be any of the examples of user systems 12 described above. The edge routers can communicate with one or more core switches 220 and 224 through a firewall 216. The core switches can communicate with a load balancer 228, which can distribute server load over different pods, such as the pods 240 and 244. The pods 240 and 244, which can each include one or more servers or other computing resources, can perform data processing and other operations used to provide on-demand services. Communication with the pods can be conducted via pod switches 232 and 236. Components of the on-demand database service environment can communicate with database storage 256 through a database firewall 248 and a database switch 252.

Figure 2B:
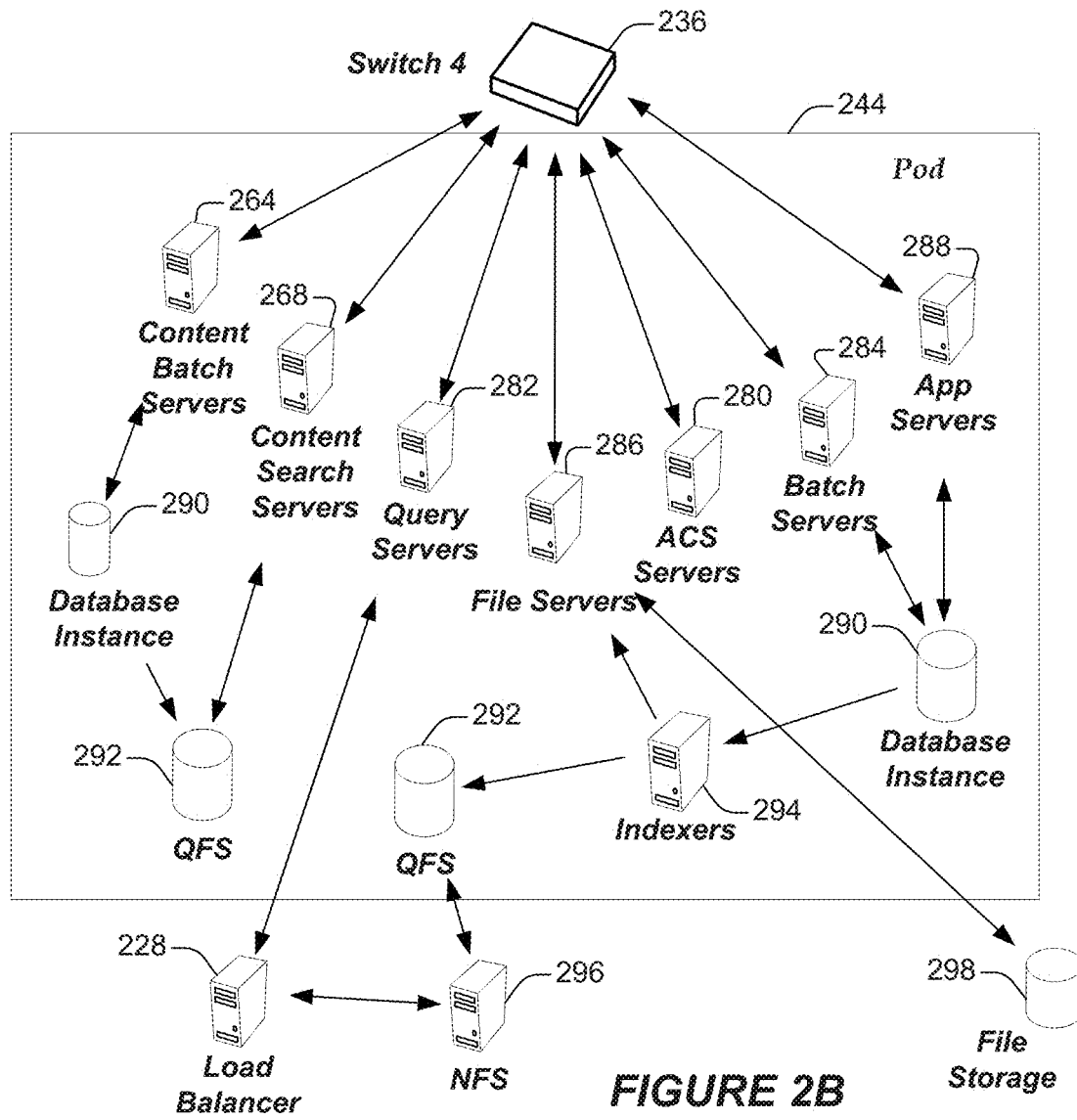
FIG. 2B shows a system diagram further illustrating example architectural components of an on-demand database service environment according to some implementations.

As shown in FIGS. 2A and 2B, accessing an on-demand database service environment can involve communications transmitted among a variety of different hardware or software components. Further, the on-demand database service environment 200 is a simplified representation of an actual on-demand database service environment. For example, while only one or two devices of each type are shown in FIGS. 2A and 2B, some implementations of an on-demand database service environment can include anywhere from one to several devices of each type. Also, the on-demand database service environment need not include each device shown in FIGS. 2A and 2B, or can include additional devices not shown in FIGS. 2A and 2B.

Additionally, it should be appreciated that one or more of the devices in the on-demand database service environment 200 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 204 is intended to refer to a data network or multiple data networks, often including the Internet. Client machines communicably connected with the cloud 204 can communicate with other components of the on-demand database service environment 200 to access services provided by the on-demand database service environment. For example, client machines can access the on-demand database service environment to retrieve, store, edit, or process information. In some implementations, the edge routers 208 and 212 route packets between the cloud 204 and other components of the on-demand database service environment 200. For example, the edge routers 208 and 212 can employ the Border Gateway Protocol (BGP). The BGP is the core routing protocol of the Internet. The edge routers 208 and 212 can maintain a table of IP networks or 'prefixes', which designate network reachability among autonomous systems on the Internet.

In some implementations, the firewall 216 can protect the inner components of the on-demand database service environment 200 from Internet traffic. The firewall 216 can block, permit, or deny access to the inner components of the on-demand database service environment 200 based upon a set of rules and other criteria. The firewall 216 can act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 can be configured as network bridges that quickly route data between different components within the on-demand database service environment. In some implementations, the use of two or more core switches 220 and 224 can provide redundancy or reduced latency.

In some implementations, the pods 240 and 244 perform the core data processing and service functions provided by the on-demand database service environment. Each pod can include various types of hardware or software computing resources. An example of the pod architecture is discussed in greater detail with reference to FIG. 2B. In some implementations, communication between the pods 240 and 244 is conducted via the pod switches 232 and 236. The pod switches 232 and 236 can facilitate communication between the pods 240 and 244 and client machines communicably connected with the cloud 204, for example via core switches 220 and 224. Also, the pod switches 232 and 236 may facilitate communication between the pods 240 and 244 and the database storage 256. In some implementations, the load balancer 228 can distribute workload between the pods 240 and 244. Balancing the on-demand service requests between the pods can assist in improving the use of resources, increasing throughput, reducing response times, or reducing overhead. The load balancer 228 may include multilayer switches to analyze and forward traffic.

In some implementations, access to the database storage 256 is guarded by a database firewall 248. The database firewall 248 can act as a computer application firewall operating at the database application layer of a protocol stack. The database firewall 248 can protect the database storage 256 from application attacks such as structure query language (SQL) injection, database rootkits, and unauthorized information disclosure. In some implementations, the database firewall 248 includes a host using one or more forms of reverse proxy services to proxy traffic before passing it to a gateway router. The database firewall 248 can inspect the contents of database traffic and block certain content or database requests. The database firewall 248 can work on the SQL application level atop the TCP/IP stack, managing applications' connection to the database or SQL management interfaces as well as intercepting and enforcing packets traveling to or from a database network or application interface.

In some implementations, communication with the database storage 256 is conducted via the database switch 252. The multi-tenant database storage 256 can include more than one hardware or software components for handling database queries. Accordingly, the database switch 252 can direct database queries transmitted by other components of the on-demand database service environment (for example, the pods 240 and 244) to the correct components within the database storage 256. In some implementations, the database storage 256 is an on-demand database system shared by many different organizations as described above with reference to FIGS. 1A and 1B.

FIG. 2B shows a system diagram further illustrating example architectural components of an on-demand database service environment according to some implementations. The pod 244 can be used to render services to a user of the on-demand database service environment 200. In some implementations, each pod includes a variety of servers or other systems. The pod 244 includes one or more content batch servers 264, content search servers 268, query servers 282, file force servers 286, access control system (ACS) servers 280, batch servers 284, and app servers 288. The pod 244 also can include database instances 290, quick file systems (QFS) 292, and indexers 294. In some implementations, some or all communication between the servers in the pod 244 can be transmitted via the switch 236.

In some implementations, the app servers 288 include a hardware or software framework dedicated to the execution of procedures (for example, programs, routines, scripts) for supporting the construction of applications provided by the on-demand database service environment 200 via the pod 244. In some implementations, the hardware or software framework of an app server 288 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods. In various implementations, the app servers 288 may be the same or similar to the app servers 100 discussed herein.

The content batch servers 264 can handle requests internal to the pod. Some such requests can be long-running or not tied to a particular customer. For example, the content batch servers 264 can handle requests related to log mining, cleanup work, and maintenance tasks. The content search servers 268 can provide query and indexer functions. For example, the functions provided by the content search servers 268 can allow users to search through content stored in the on-demand database service environment. The file servers 286 can manage requests for information stored in the file storage 298. The file storage 298 can store information such as documents, images, and basic large objects (BLOBs). By managing requests for information using the file force servers 286, the image footprint on the database can be reduced. The query servers 282 can be used to retrieve information from one or more file systems. For example, the query system 282 can receive requests for information from the app servers 288 and transmit information queries to the NFS 296 located outside the pod.

The pod 244 can share a database instance 290 configured as a multi-tenant environment in which different organizations share access to the same database. Additionally, services rendered by the pod 244 may call upon various hardware or software resources. In some implementations, the ACS servers 280 control access to data, hardware resources, or software resources. In some implementations, the batch servers 284 process batch jobs, which are used to run tasks at specified times. For example, the batch servers 284 can transmit instructions to other servers, such as the app servers 288, to trigger the batch jobs.

In some implementations, a QFS 292 is an open source file system available from Sun Microsystems® of Santa Clara, Calif. The QFS can serve as a rapid-access file system for storing and accessing information available within the pod 244. The QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in the network file systems 296 or other storage systems.

In some implementations, one or more query servers 282 communicate with the NFS 296 to retrieve or update information stored outside of the pod 244. The NFS 296 can allow servers located in the pod 244 to access information to access files over a network in a manner similar to how local storage is accessed. In some implementations, queries from the query servers 282 are transmitted to the NFS 296 via the load balancer 228, which can distribute resource requests over various resources available in the on-demand database service environment. The NFS 296 also can communicate with the QFS 292 to update the information stored on the NFS 296 or to provide information to the QFS 292 for use by servers located within the pod 244.

In some implementations, the pod includes one or more database instances 290. The database instance 290 can transmit information to the QFS 292. When information is transmitted to the QFS, it can be available for use by servers within the pod 244 without using an additional database call. In some implementations, database information is transmitted to the indexer 294. Indexer 294 can provide an index of information available in the database 290 or QFS 292. The index information can be provided to file force servers 286 or the QFS 292.

Web Resource Integration and Sandboxing Embodiments

Figure 3:
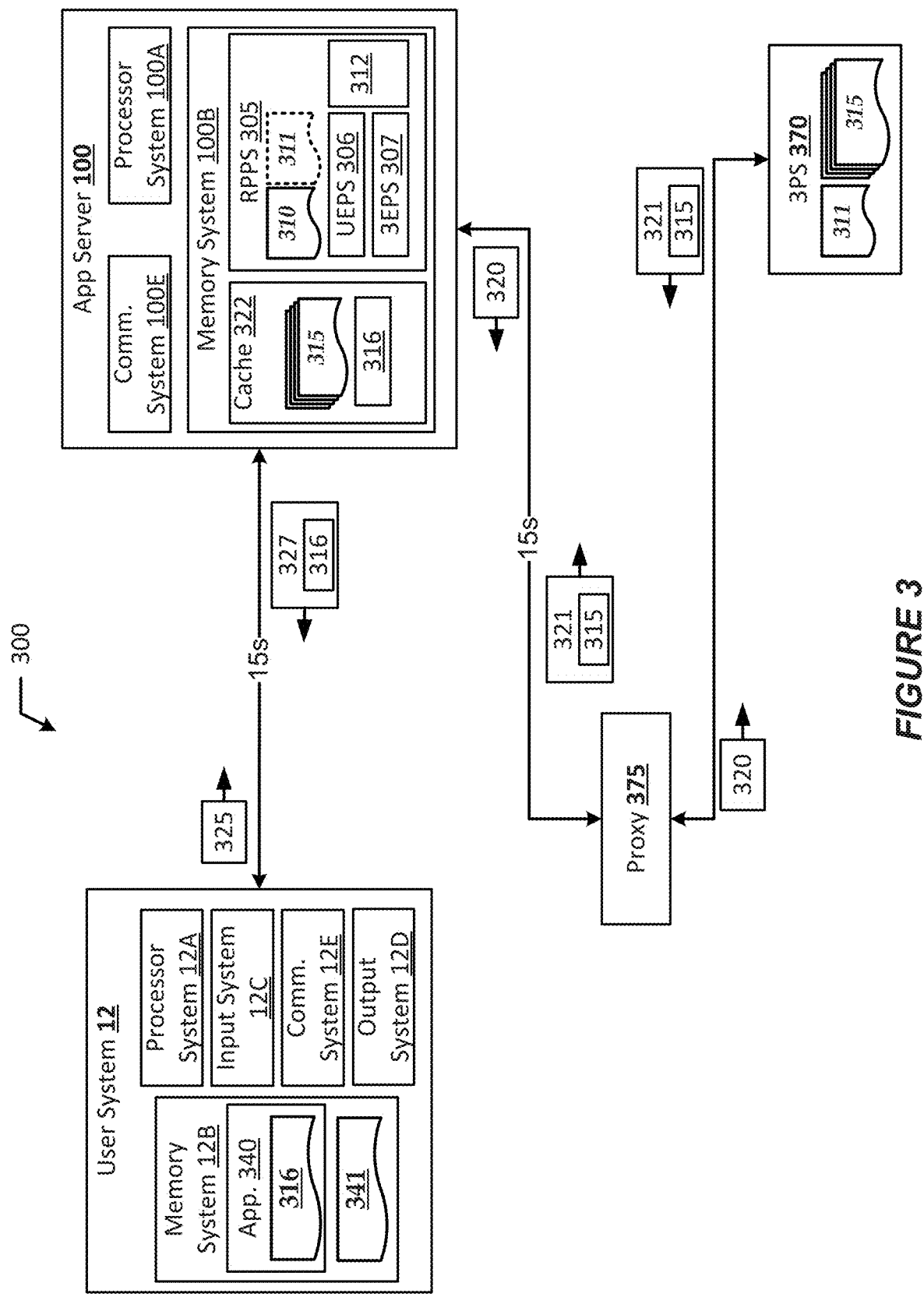
FIG. 3 shows an arrangement in which various embodiments discussed herein may be practiced.

FIG. 3 shows an arrangement 300 in which an app server 100 of the database system 16 may interact with a user system 12 and a third party service (3PS) 370 via a proxy 375 in accordance with various embodiments. In FIG. 3, like numbered items are as described with respect to FIGS. 1A-2B (although not all items shown by FIGS. 1A-2B are shown by FIG. 3). In the example shown by FIG. 3, the app server 100 may include a processor system 100A, which may be the same or similar to processor system 17 and/or processor system 12A discussed previously; memory system 100B, which may be the same or similar to program code 26 and/or memory system 12B discussed previously; and a communication system 100E, which may be the same or similar to network interface 20 and/or communication system 12E discussed previously.

Referring to the user system 12, the memory system may include application (app) 340. App 340 may be a web, native, or hybrid application designed to run on the user system 12, and used to access and manipulate tenant data as discussed previously. The app 340 may also access the resource 315 via app server 100 in a same or similar manner as discussed previously. For example, the processor system 12A implementing the app 340 may be capable generating a request 325 for an object 316, and may control sending of the request 325 to the app server 100. In response, the app server 100 may send a response 327 including the requested object 316 to the user system 12. The object 316 included in the response 327 may include, for example, one or more resources 315 including program code (e.g. JavaScript code, Ajax code, etc.), web objects (e.g., HTML, XML, JSON, CSS, MessagePack™, Apache® Thrift, ASN.1, Google® protobuf, or the like or other like documents; and/or content including audio, image, video, etc.), database objects (DBOs) (e.g., datasets, fields, records, data elements, data values, etc.), and/or the like. Upon receipt of the response 327, the app 340 may control execution, rendering or display of the object 316 in an application container or browser. The request 325 and response 327 may be any suitable message type or format, such as an HTTP message, a Session Initiation Protocol (SIP) message, Real-time Transport Protocol (RTP) message, Extensible Messaging and Presence Protocol (XMPP) message, and/or the like.

In embodiments, the app 340 may be configured to consume content only from tenant org domains (e.g., a domain of 3PS 370). In such embodiments, the application container or browser of the user system 12 may enforce content restrictions to all the usages which are not specified/whitelisted by a Content Security Policy (CSP) 341. The CSP 341 may be a configuration, policy, or other like document that allows website/platform owners/operators to declare approved origins of content or resources 315 that browsers and/or application containers are allowed to load for that website/platform. As examples, covered resource types may include, inter alia, JavaScript, CSS, HTML frames, web workers (e.g., JavaScript running in the background and independently of an HTML page), fonts, images, embeddable objects such as Java applets, ActiveX, audio and video files, and other HTML5 features. CSPs is a very widely used tool in any web applications for security content boundaries. Various rules in this policy ensures that browser ensures only allowed network traffic and content consumption An example CSP 341 of the app 340 is shown by table 1.

TABLE 1 example CSP 341

| | Policy directive | Feature Usage |
|---|---|---|
| 1 | Content-Security-Policy | |
| 2 | base-uri | |
| 3 | block-all-mixed-content | |
| 4 | child-src | |
| 5 | connect-src | Allows network traffic to be connected |
| 6 | default-src | |
| 7 | disown-opener | |
| 8 | font-src | Allow font to be downloaded. |
| 9 | form-action | |
| 10 | frame-ancestors | |
| 11 | frame-src | |
| 12 | img-src | Allow image to be download. |
| 13 | manifest-src | |
| 14 | media-src | Allow media content to download. |
| 15 | navigation-to | |
| 16 | object-src | |
| 17 | plugin-types | |
| 18 | referrer | |
| 19 | report-sample | |
| 20 | report-to | |
| 21 | report-uri | |
| 22 | require-sri-for | |
| 23 | sandbox | |
| 24 | script-src | Allow 3PS 370 script code to executed. |
| 25 | strict-dynamic | |
| 26 | style-src | Allow 3PS 370 style code to executed. |
| 27 | upgrade-insecure-requests | |
| 28 | worker-src | |

In the example of table 1, the CSP 341 allows network traffic to be connected to the user system 12, and allows fonts, images, and media to be downloaded to the user system 12. Additionally, the CSP 341 of app 340 only allows for JavaScript ('script-src') and CSS ('style-src') of the main domain of 3PS 370 to be executed within the browser or application container of app 340. In this case, the application container or browser may make sure that JavaScript and CSS content will only be served from the 3PS 370 main domain and not from any other domain(s).

The script-src and style-src policy directives may be the most insecure policy directives listed in table 1. As mentioned previously, these directives allow the browser or application container to run any 3PS 370 content in the browser or application container. If the app 340 opens up these two policy directives with 3PS 370 content, it may be difficult to restrict security of the app 340 because code of the 3PS 370 may access the app 340 cookies and session data. According to various embodiments, script-src, style-src, and/or other resource 315 types may be restricted to be consumed only from main application domain. As further discussed infra, the user system 12 may consume resources 315 from the RPPS 305 because the RPPS 305 may be hosted in the app 340 domain and may authenticate trusted resources 315 integrity.

Moreover, once the 3PS 370 resources 315 are consumed by the user system 12 from the RPPS 305, those resources 315 may only be used within corresponding sandbox environments. These sandbox environments may only allow a very limited subset of API access to the resources 315, which are secure to use and may not compromise the resources 315.

The 3PS 370 may be a user/tenant of the database system 16 (e.g., a tenant/organization (org) or developers associated with the tenant) that may develop applications and/or platforms that interact and/or integrate with the database system 16 and utilize data from an associated tenant space in tenant DB 22. The 3PS 370 may develop and/or generate various web resources 315 (also referred to as "resources 315") that utilize data obtained from an associated tenant space to render/display visual representations of relevant tenant data. When the resources 315 are obtained and rendered in/by an application 340 container or browser of the user system 12, the resources 315 may provide components (GCEs, widgets, tabs, reports, dashboards, pages, etc.) that allow the user of the user system 12 to access, render, and manipulate data in the tenant space. For ease of illustration, FIG. 3 shows the 3PS 370 as a single entity; however, in various implementations the 3PS 370 may comprise one or multiple hardware devices (e.g., one or more servers and/or storage devices), where different sets or groupings of devices may provide different resources 315 for different applications or platforms.

Issues may arise when the 3PS 370 wishes to integrate some or all of these resources 315 into a same web object or webpage even though these resources 315 may be provided by different sets/groups of devices. This is because resource integration is difficult when using HTML inline frames (iFrames) because each iFrame runs in its own context and requires an API to allow different iFrames (and content therein) to communicate with one another. Issues may also arise when the 3PS 370 would like to provide bug fixes, feature updates, branding, etc. to their resources 315 in alignment with a regular release cycle, which may be more frequent than release cycles of the database system 16. This is because user systems 12 can execute code hosted by the 3PS 370 (including code provided by other systems/platforms separate from the 3PS 370), which is not controlled by the database system 16 and may lead to security breaches. In embodiments, the app server 100 may implement a resource provider proxy service (RPPS) 305 to proxy the resources 315 from resources of the database system 16.

Referring to the app server 100, the memory system 100B may store program code of the RPPS 305 (and elements/components therein) to implement the various mechanisms, functions, processes, etc. for integrating and sandboxing resources 315 as described herein. In some implementations, the program code may comprise software, modules, logic, programs, servlets, applets, apps, and/or other executable code for causing the processor system 100A to perform any one or more of the methodologies discussed herein. In one example, the RPPS 305 may comprise one or more content delivery network (CDN) servlets or a virtual CDN proxy servers (collectively referred to as "CDNs", "CDN servers", or the like). These CDN servers may offload resources 315 from CDNs associated with the 3PS 370 to a main domain or tenant space of the 3PS 370 in the database system 16. In this way, the resources 315 may be served by the app server 100 from the 3PS 370 main domain, and the app 340 does not need to consume content from the CDNs associated with the 3PS 370. These proxy servers however will serve only trusted signed content. Further description about this proxy CDN servers are mentioned below In embodiments, the RPPS 305 may implement a user system end-point service (UEPS) 306 to serve and/or expose 3PS 370 services (e.g., including one or more resources 315)

to user systems 12 running the app 340 over secure link 15s. The secure link 15s may be a secure version of the network connection 15 discussed previously, which may be used for communicating the requests 325 and responses 327. The UEPS 306 may create an endpoint in the app 340, which may allow the RPPS 305 to service requests 325. In some implementations, the UEPS 306 may only service valid requests 325 based on correct session cookies, and may send HTTP error codes in responses 327 where a request 325 is invalid. In some implementations, the UEPS 306 may expose valid request attributes so that caller can be easily distinguished and identified. The UEPS 306 may enable the app 340 to be served within object 316 having sandboxed resources 315 using a CSP, which only allows specified domains (e.g., the 3PS 370 and/or other tenant/orgs of the database system 16) to be connected to the RPPS 305. Since the CSP restricts resources to be consumed only from the specified domains, the embodiments allow orgs/developers to control the particular content that can be run inside the app 340. Furthermore, where browsers are used, little to no changes are required to implement such embodiments since modern browsers impose CSP restrictions and make sure that only specified domain resources are consumed.

Once the object 316 is loaded on the user system 12, the resources 315 making up the object 316 may be virtually isolated from one another in separate domains using a sandboxing framework or some other suitable mechanism. In one example, the resources 315 may be sandboxed using eval( ) function in JavaScript. In another example, the resources 315 may be sandboxed using the Salesforce® LockerService framework, which provides client side JavaScript sandboxing by isolating individual components in their own containers or wrappers, and only allowing components to access one another using supported APIs. For instance, LockerService implicitly enables JavaScript ES5 strict mode, and only allows a component to traverse a document object model (DOM) and access elements created by a component in the same namespace. Additionally, LockerService applies restrictions to global references by providing secure versions of non-intrinsic objects, such as window. These secure objects may be referred to as "secure wrappers", "wrappers", or the like. A component can interact with a secure wrapper in the same way as with the non-intrinsic object, but the secure wrappers filters access to the object and its properties and expose only a subset of the API of the underlying objects. Other sandboxing frameworks may be used in other embodiments, such as browser or client-side sandboxing frameworks (e.g., JSand, ECMAScript (SES), ConScript, Contego, WebJail, NX framework, JoshuaWise, Self-protecting JavaScript (SPJS), AdSentry, Web Workers, Web Components, etc.); server-side third party code enforcement sandboxing frameworks may be used (e.g., ADSafe, ADSafety, and Facebook JS), which require third party code to conform with various policies or structures; server-side code transformation sandboxing frameworks (e.g., Google® Caja, Jacaranda, Web-sandbox, etc.), which statically analyze and rewrite third party code on the server side into a safe version; and/or other server-side code transformation sandboxing frameworks (e.g., BrowserShield, Browser-Enforced Embedded Policies (BEEP), etc.), which instrument third party code with extra checks that mediate access to certain functionality.

In embodiments, the RPPS 305 may also implement a 3PS end-point service (3EPS) 307 to connect with server(s) of the 3PS 370, caching resources 315, managing 3PS 370 authenticity/authorization, etc. over a secure link 15s that is the same or similar to the secure link 15s between the app server 100 and user system 12. Examples of the secure links 15s may include, inter alia, transport layer security (TLS), Secure Sockets Layer (SSL), HTTP Secure (HTTPS), or some other suitable secure channel or tunnel mechanism.

The RPPS 305 may also include or implement a caching mechanism to obtain and store 3PS 370 resources 315 to avoid unnecessary resource 315 fetching from the 3PS 370 and to serve existing and/or new user requests more efficiently. The caching mechanism may include any suitable system, program code, etc. that, upon receipt, temporarily stores requested resources 315 in cache 322. The caching mechanism may include aspects of web caching mechanisms and database (DB) caching mechanisms. A web caching mechanism may temporarily store web objects, and a DB caching mechanism may temporarily store DBOs from a multi-tier, multi-tenant DB system, such as DB system 16. In some implementations, various components throughout the delivery path (e.g., intermediate nodes or hops), including proxy 375 may also cache items to speed up subsequent requests 320, subject to the caching policies for the resources 315. As an example, the caching mechanism may cache responses 327 to requests 325 and specific resources 315 associated with the requests 325 according to certain rules, policies, configurations, etc. When an object 316 includes a reference or link to the cached resources 315, the caching mechanism may redirect subsequent requests 325 for those resources 315 from the originating location of the requested resources 315 (e.g., a URL of one or more servers of the 3PS 370) to the cache 322 of the app server 100, or to another app server 100 that is closest to the user system 12.

In various embodiments, the caching mechanism of the RPPS 305 may deliver or serve an object 316 to the user system 12, which includes or otherwise integrates various resources 315. For example, the object 316 may be a web document that embeds, references, or otherwise incorporates one or more external resources 315 (e.g., using the source (src) attribute in the script, embed, image (img), audio, and/or video HTML tags; using the relationship (rel) attribute in the anchor (a), link, and/or area HTML tags; using the open( ) method in Ajax or XMLHttpRequest (XHR); using loadStrings, loadJSON, loadXML, loadTable in p5.js of the Processing programming language; using doc.load (xml) or variants thereof in Salesforce® Apex; and/or the like), and the external resources 315 may be served to the user system 12 from the cache 322 rather than from the 3PS 370 and/or partner service providers. In some embodiments, such as when the object 316 includes code (e.g., JavaScript or the like) for providing streaming services (e.g., for calling or video conferencing applications, interactive gaming applications, etc.), external references 315 may be served from the 3PS 370 during a loading or rendering process of the object 316. In these embodiments, the RPPS 305 may instruct the 3EPS 307 to establish an endpoint with the 3PS 370 to ensure that 3PS 370 traffic is communicated to the user system 12 and/or that user system 12 traffic is communicated to the 3PS 370.

To cache the resources 315, the RPPS 305 may generate a request 320 for various resources 315, and may send the request 320 to the proxy 375 for delivery to the 3PS 370. The proxy 375 may forward the request 320 to the 3PS 370. In response to receipt of the request 320, the 3PS 370 may generate a response 321 that includes the requested resources 315, which may be sent to the proxy 375 and delivered to the app server 100. Upon receipt of the response 321, the RPPS 305 may store the obtained resources 315 in cache 322.

In some implementations, the caching mechanism may store resources 315 for a period of time (e.g., a number of hours, days, weeks, months, etc.), which may be predefined or configured (e.g., indicated by the aforementioned caching policies). In these cases, the caching mechanism may control storage of the resources in cache 322, as well as generate and control storage of a time stamp (in the cache 322 or some other memory location) to indicate a receipt time of the resources 315. Additionally, upon receipt of a valid request 325 for external resource(s) 315 of an object 316, the caching mechanism may check the time stamp of the requested resource(s) 315, and the caching mechanism may then serve the requested resource(s) 315 from the cache 322 if the time stamp is less than the cache time period. Otherwise, the RPPS 305 may send a request 320 to the 3PS 370 for the requested resource(s) 315 if the time stamp is greater than or equal to the cache time period.

The cache 322 may be any dedicated (physical or logical) memory area or region that may be used to store resources 315. In most embodiments, the cache 322 may be a web/DB caching system implemented by the database system 16, a virtual proxy server, or the like. In these embodiments, the cache 322 may be a reserved section (or set of memory locations) of the memory system 100B. In some implementations, the cache 322 may include or may be embodied as one or more cache memory devices that the processor system 100A can access more quickly than other types of memory (for example, such as an on-die cache, an on-processor cache, or an off-die cache that resides on same system on chip (SoC), system in package (SiP) as the processor system 100A).

In embodiments the RPPS 305 may only obtain (and cache) resources 315 from known endpoints that are specified/defined in/by a configuration object 310 (also referred to as a "whitelist"). The configuration object 310 may describe the resources 315 that are valid for the RPPS 305 to consume and how to consume such resources 315. For example, the configuration object 310 may indicate a file path to a manifest file for the resources 315 hosted by the 3PS 370, a Domain Name System (DNS) lookup/resolution for the manifest file path and pointing to the servers of the 3PS 370, name(s) of the resources 315, version number(s) of the resources 315, and the like. In embodiments, each component of an app 340 may have a corresponding configuration object 310, which indicates resource(s) 315 to be consumed for that component and a CSS for that component. An example configuration object 310 is shown by table 1.

TABLE 2 example configuration object 310 resourceObjectName: "InitJsProduction",
manifest: https://<hostname>/production/manifest.xml,
name: <resourceNameToFindInManifest>,
version: <VersionNumber>
resourceObjectName: "InitJsStaging",
manifest: https://<hostname>/latest/manifest.xml,
name: <resourceNameToFindInManifest>,
version: <VersionNumber>

In table 2, the "resourceObjectName" field may indicate a name of resource(s) 315 of the 3PS 370. In some implementations, the name of resource(s) 315 may be a code name for the resource(s) 315 used by the RPPS 305. The "manifest" field may indicate a path to a manifest file 311 for the resource(s) 315. This file path may be an HTTP Secure (HTTPS) path or URL of the manifest file 311 hosted by the 3PS 370. In this example, the manifest file is in XML, however, the manifest 311 may be in any other suitable format such as JSON, MessagePack™, Apache® Thrift, ASN.1, Google® protobuf, or the like. The "name" field may indicate a name of the resource(s) 315 to find from the manifest file 311, which may be useful when the manifest file 311 indicates multiple resources 315 with different names. The "version" field may indicate a desired version of the resource(s) 315 to consume. Although not shown by table 2, the configuration object 310 may also include a "dnsManifest" field to indicate a DNS lookup/resolution for the manifest file path, which may point to the 3PS 370 servers.

The manifest file 311 may include metadata or other like information for a group of resources 315 that are part of a coherent unit, such as a single web object to be served to a user system 12. The manifest file 311 may include or indicate a list of resources 315 including version numbers, an address of each listed resource 315, a signature for each listed resource 315, a public key to be used with a signing algorithm in order to decode valid resources 315. In some implementations, the metadata of the manifest file 311 may also include structure or assembly information detailing how the resources 315 are to be structured and synchronized together. An example manifest file 311 is shown by table 3.

TABLE 3 example manifest file 311

```
{
publickeyinfo: {
value: "<publicKey>"
},
    component1: {
    InitJS: {
    [
        {
            version: "1.2.3",
            url: "https://abc.xyz.com/v123/widget.js",
            signature: "<signature>"
        },
        {
            version: "2.3.4",
            url: "https://abc.xyz.com/v234/widget.js",
            signature: "<signature>"
        },
        {
            version: "3.4.5",
            url: "https://abc.xyz.com/v345/widget.js",
            signature: "<signature>"
        }
    ]
    },
    componentCSS: {
    [
        {
            version: "1.2.3",
            url: "https://abc.xyz.com/v123/widget.css",
            signature: "<signature>"
        },
        {
            version: "2.3.4",
            url: "https://abc.xyz.com/v234/widget.css",
            signature: "<signature>"
        },
        {
            version: "3.4.5",
            url: "https://abc.xyz.com/v345/widget.css",
            signature: "<signature>"
        }
    ]
    }
}
}
```

In table 3, the "publickeyInfo" field may indicate or include a public key to be used with a signing algorithm in order to decode valid resources 315. The manifest file 311 also includes a list of resources 315, which as listed by table 3 are "component1" and "componentCSS". Each of the listed components may include one or multiple URLs for accessing a resource 315 and may list a corresponding version number and a corresponding signature. In the example of table 3, the component1 includes URLs for accessing three different versions of a InitJS resource and the componentCSS includes URLs for accessing three different versions of a CSS to be used in conjunction with the component1. With respect to the listed signatures, when a resource 315 is downloaded to the RPPS 305, the RPPS 305 may construct a signature using a suitable security algorithm and the public key indicated by the manifest 315. The RPPS 305 may compare the constructed signature with a signature indicated by the manifest 311, and if the signatures match, then the RPPS 305 may store the resource in the cache 322 and may serve the resource 315 to the user system 12. The signatures may be generated using any suitable cryptographic algorithm and/or hashing function including, inter alia, elliptic curve cryptography (ECC), Elliptic Curve cryptography Digital Signature Algorithm (ECDSA), Rivest-Shamir-Adleman (RSA) cryptography, advanced encryption system (AES) algorithm, a triple data encryption algorithm (3DES), a secure hash algorithm (SHA), and the like.

Figure 4:
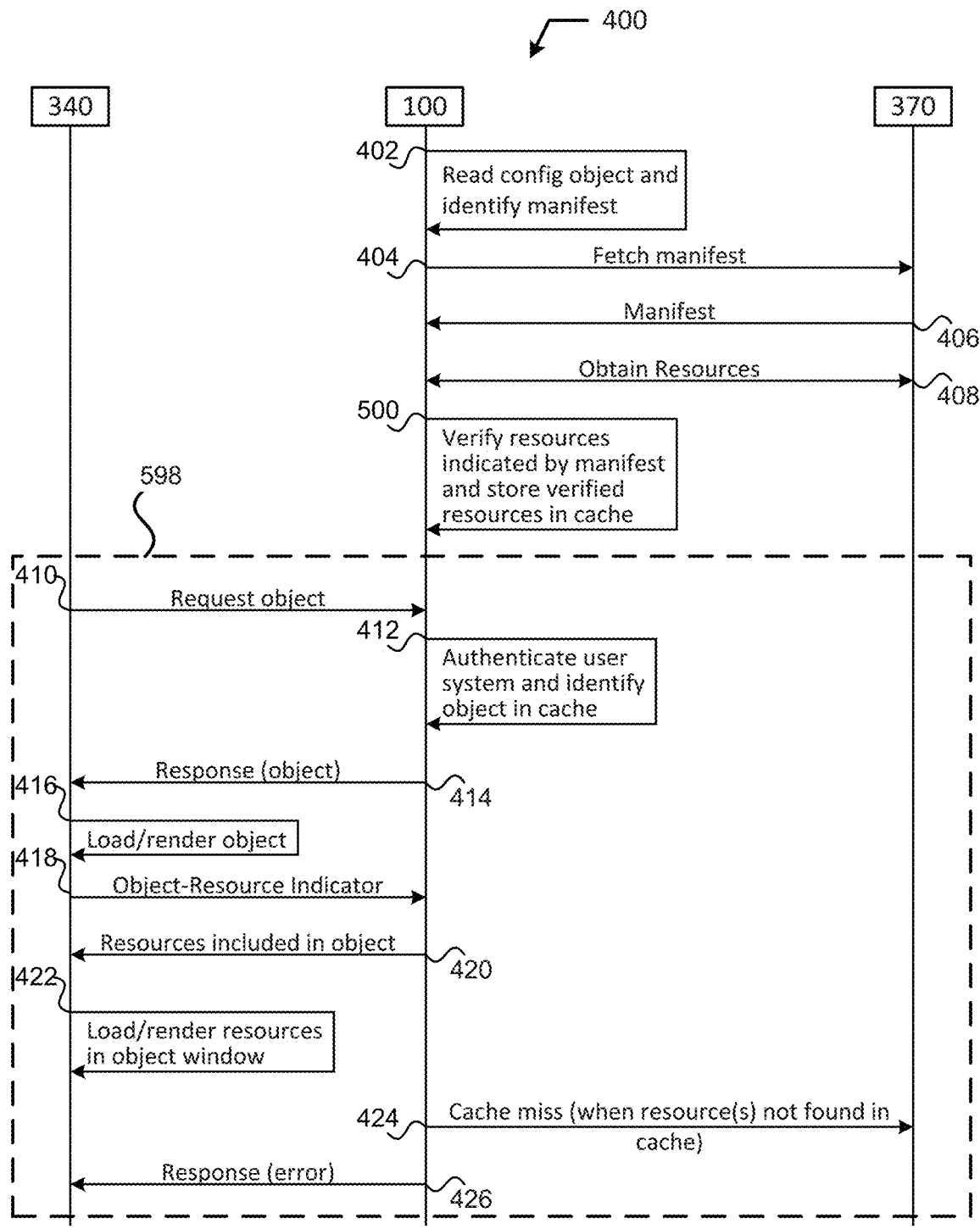
FIG. 4 shows an example process for practicing the various embodiments discussed herein.

The user systems 12 and app server 100 of arrangement 300 may operate according to the procedure discussed with regard to FIG. 4.

FIGS. 4-7 illustrates various processes for practicing the example embodiments discussed herein. For illustrative purposes, the operations of processes of FIGS. 4-7 are described as being performed by elements/components/devices shown and described with regard to FIGS. 1A-3; however, other computing devices may operate the depicted processes in a multitude of implementations, arrangements, and/or environments. In embodiments, the processes may be embodied as program code stored in a memory system, which when executed by a processor system of a computer system, causes the computer system to perform the various operations of such processes. While particular examples and orders of operations are illustrated in FIGS. 4-7, in various embodiments, these operations may be re-ordered, separated into additional operations, combined, or omitted altogether.

FIG. 4 illustrates a process 400 for serving resources 315 in accordance with various embodiments. Process 400 may begin at operation 402 where the app server 100 may implement the RPPS 305 to read a configuration object 310 and identify a manifest 311 indicated by the configuration object 310. In some embodiments, multiple configuration objects 310 may be statically loaded upon execution of the app 340 by user system 12.

At operation 404, the app server 100 may implement the RPPS 305 to fetch the identified manifest file 311, and at operation 406, the app server 100 may implement the RPPS 305 to receive the manifest 311 from the 3PS 370. In embodiments, the RPPS 305 may control the communication system 100E of the app server 100 to navigate to a location of the manifest 311 hosted by the 3PS 370, and/or to send a request 320 to the 3PS 370 for the manifest 311, which may include a URL or other like address of the manifest 311 hosted by the 3PS 370. In embodiments, the RPPS 305 may parse the manifest file 311 from the 3PS 370 and extract resource configuration information (e.g., URL(s) of the resource(s) 315, version number(s), signature(s) of the resource(s) 315, and public key information) from the manifest 311. Although not shown by FIG. 4, the RPPS 305 may issue an error message (including suitable error codes to indicate a reason for the error) to the 3PS 370 upon obtaining an invalid manifest file 311 or if an error occurs in obtaining the manifest file 311.

At operation 408, the app server 100 may implement the RPPS 305 to obtain resources 315 from the 370 using the information contained in the manifest 311. In embodiments, the RPPS 305 may download resources 315 using the address indicated by the manifest 311 when the resources 315 have a name that is included or indicated by both the configuration object 310 and the manifest 311. When the resources 315 are obtained from the 3PS 370, the app server 100 may implement the RPPS 305 to perform process 500, where the RPPS 305 may verify the resources 315 indicated by the manifest 311 and may store the verified resources in the cache 322. Process 500 may be an authentication (integrity check) procedure for the resources 315, where the RPPS 305 hashes the obtained resources 315 and uses a public key indicated by the manifest 311 to decrypt signatures associated with the resources 315 ("resource signatures"). The decrypted resource signatures may be matched with the hashed resources 315, where successful match(es) may indicate that the resource(s) 315 are verified as originating from the 3PS 370 and where not tampered with during transit to the app server 100. Once verified, the RPPS 305 may store the verified resource(s) 315 in the cache 322 with a time stamp of the verification and/or receipt of the resource(s) 315 and/or the RPPS 305 may replace a cache entry for those resources 315. Process 500 is discussed in more detail with regard to FIG. 5.

After performing process 500, the RPPS 305 may proceed to perform serving process 598, which includes operations 410-426. At operation 410, the RPPS 305 may obtain a request 325 for resource(s) 315 from the app 340 implemented by the user system 12. At operation 412, the app server 100 may implement the RPPS 305 and/or the UEPS 306 to authenticate the user system 12, and the app server 100 may implement the RPPS 305 to identify the requested object 316 in the cache 322. If the requested object 316 is stored in the cache 322, the app server 100 may implement the RPPS 305 to proceed to operation 414 to send a response 327 with an object 316 to the app 340 implemented by the user system 12. At operation 416, the user system 12 may implement the app 340 to load and render the object 316, which, as discussed previously, may include references or embed external resource(s) 315.

At operation 418, the user system 12 implementing the app 340 may send an Object-Resources indicator to the RPPS 305 to request external resources 315 to be loaded/rendered in the object 316. In response, at operation 420 the app server 100 may implement the RPPS 305 to send the resources 315 indicated by the Object-Resources indicator to the app 349. At operation 422, the user system 12 may implement the app 340 to load/render the obtained resources 315 in a window or screen of the object 316. In embodiments, operations 418-422 may take place while the app 340 loads/renders the object 316 and/or in response to various user interactions with the object 316 and/or app 340 (e.g., mouse clicks, mouse-overs, key strokes, touchscreen gestures, etc.). Additionally, at operation 422, upon loading/rendering the various resource(s) 315, the browser or application container may sandbox or otherwise isolate the various resource(s) 315 from one another.

In a first example, the object 316 may include an HTML tag with the src attribute that has a URL as a value (e.g., <img src="URL">). In this example the src attribute may instruct the browser or application container of the app 340 to send an HTTP message (e.g., GET method) to the app server 100 to request the resource 315 located at the URL, and the RPPS 305 may serve the requested resource 315 from the cache 322 to the app 340. In the first example, the URL may be a relative URL (e.g., pointing to a location within a domain of the object, like src "image.jpg") or an absolute URL (e.g., pointing to a location outside of the object's domain, like src="https://<hostname>/image.jpg"). In a second example, the object 316 may include JavaScript or other like code that obtains and sends back information (e.g., in an GET or POST method HTTP message) that is not typically included in an HTTP header, such as an indication that the object 316 is being loaded/rendered, one or more resources 315 to be loaded in the object 316, user agent information, and/or various user system related information. In response, the RPPS 305 may serve the requested resource(s) 315 from the cache 322 to the app 340.

Referring back to operation 412, if the requested object 316 is not in the cache 322, at operation 424 the app server 100 may implement the RPPS 305 to issue a cache miss indication to the 3PS 370, and at operation 422, the app server 100 may implement the RPPS 305 to send a response 327 with an error message (e.g., a suitable HTTP error code or the like) to indicate that the requested object 316 is not available. After operation 418 or 422, process 400 may end or repeat as necessary.

Figure 5:
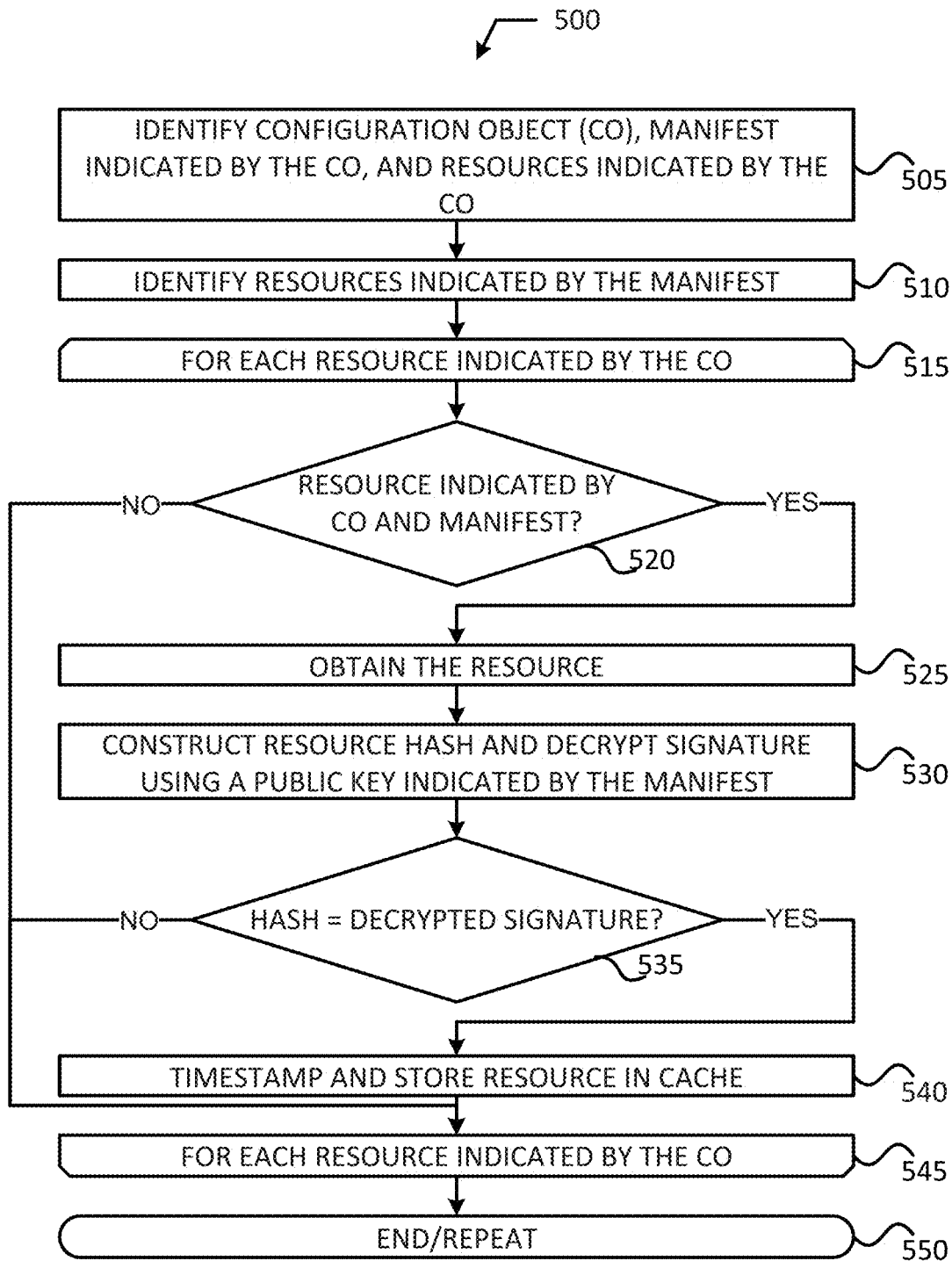
FIG. 5 shows an example caching process for consuming resources in accordance with various example embodiments.

FIG. 5 illustrates an example caching process 500 for consuming resources 315 from a tenant org (e.g., 3PS 370) in accordance with various example embodiments. In embodiments, process 500 may be performed by the RPPS 305 during the process 400 of FIG. 4 as discussed previously.

Process 500 may begin at operation 505 where a processor system 100A of the app server 100 may implement the RPPS 305 to identify a configuration object 310, a manifest 311 indicated by the configuration object 310, and resource(s) 315 indicated by the configuration object 310. At operation 510, the processor system 100A may implement the RPPS 305 to identify resource(s) 315 indicated by the manifest 311.

At opening loop operation 515, the processor system 100A may implement the RPPS 305 to process each resource 315 indicated by the configuration object 310 in turn. At operation 520, the processor system 100A may implement the RPPS 305 to determine whether the resource 315 indicated by the configuration object 310 is also indicated by the manifest 311. If the resource 315 is not indicated by both the configuration object 310 and the manifest 311, the RPPS 305 may proceed to operation 545 to process a next listed resource 315, if any.

If at operation 520 the RPPS 305 determines that the resource 315 is indicated by both the configuration object 310 and the manifest 311, then the RPPS 305 may proceed to operation 525 to obtain the resource 315 from the 3PS 370. In embodiments, the RPPS 305 may obtain the resource 315, for example, by controlling the communication system 100E to send a request 320 to the 3PS 370 via proxy 375 and controlling the communication system 100E to receive a response 321 with the resource 315 from the 3PS 370 via proxy 375 (not shown by FIG. 5). In some embodiments, the RPPS 305 may wait until all resources 315 are processed and send a batch request 320 for multiple resources 315 rather than sending individual requests for individual resources 315.

At operation 525, the processor system 100A may implement the RPPS 305 to hash the obtained resource 315 and decrypt the resource signature using a public key indicated by the manifest 311. In some implementations, the resource signature may be listed in the manifest 311. In other implementations, the RPPS 305 may perform an API call to the 3PS 370 to obtain the resource signature, and may issue an error in case the 3PS 370 cannot provide a proper signature. At operation 535, the processor system 100A may implement the RPPS 305 to determine whether the hashed resource 315 matches the decrypted resource signature. If the hash and signature do not match, the processor system 100A may implement the RPPS 305 to discard the resource 315 and proceed to operation 545 to process a net resource 315, if any.

If the hash and signature do match, at operation 540 the processor system 100A may implement the RPPS 305 to generate a timestamp and store the resource 315 in the cache 322. The timestamp may be a time of receipt of the resource 315, a time that the resource 315 was verified (e.g., when operation 535 is performed), or a time when the resource 315 is stored in cache 322. Additionally, at operation 540 the RPPS 305 may generate and store other information associated with the resource 315, such as a resource identifier, address information, request 325/response 327 information, or the like. This information may be stored in the cache 322 or in a separate database object. After the verified resource 315 is stored in the cache 322, at operation 545, the processor system 100A may implement the RPPS 305 to process a next listed resource 315, if any. After all listed resources 315 have been processed, the processor system 100A may proceed to operation 550 to end or repeat process 500 as necessary.

Figure 6:
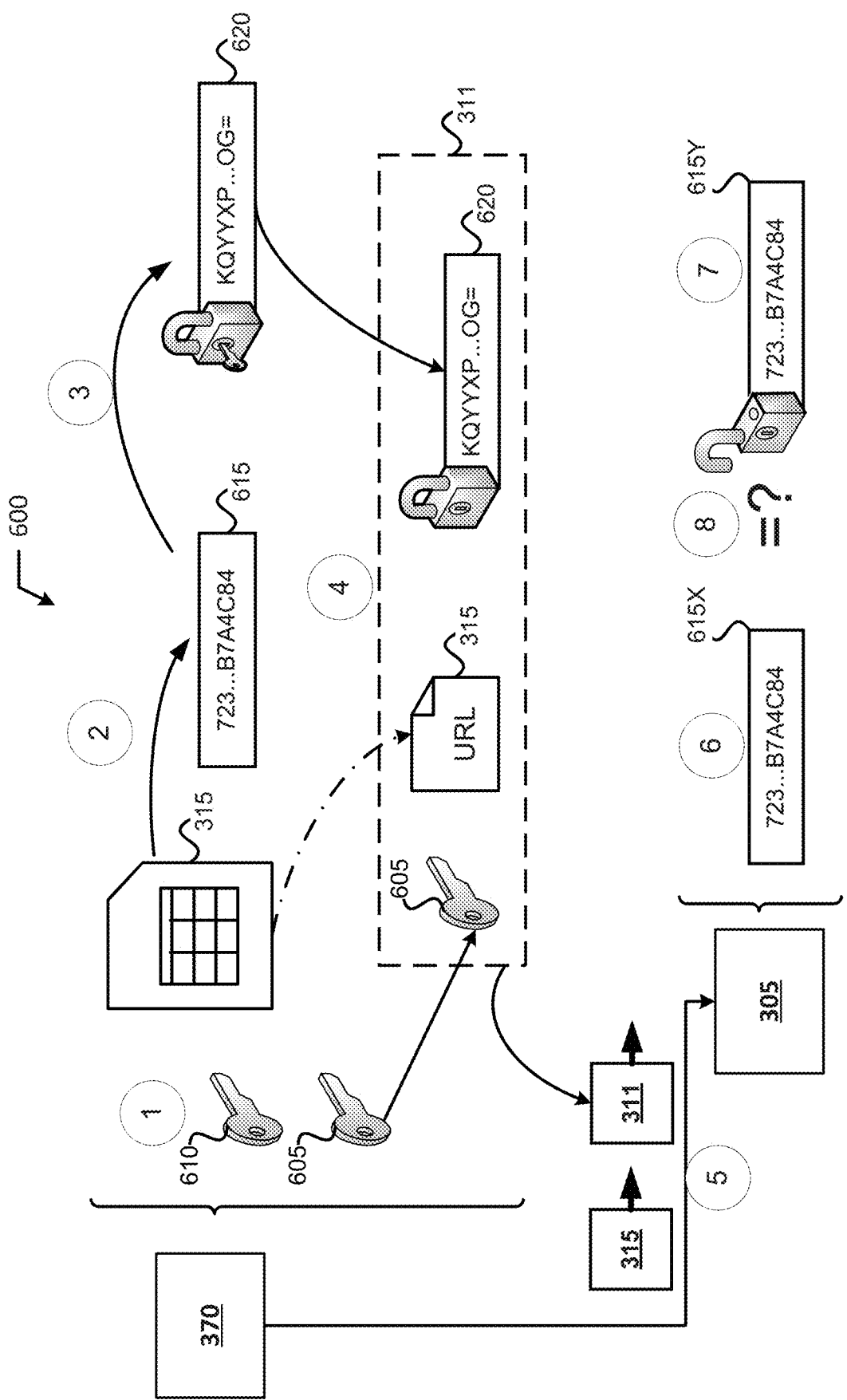
FIG. 6 illustrates a process for creating a digital signature, and authenticating and verifying the digital signature, in accordance with various embodiments.

FIG. 6 illustrates a process 600 for creating a digital signature, and authenticating and verifying the digital signature in accordance with various embodiments. Process 600 is a cryptographically based signature assurance scheme and is used in the context of public key infrastructure (PM) in which a public key used in the signature scheme is tied or bound to a particular resource 315. Process 600 may be used to provide the app server 100 (or RPPS 305) with assurance that a resource 315 is obtained from a trusted source (e.g., the 3PS 370) and that the resource 315 has not been tampered or altered during transfer of the resource 315 to the app server 100. In this regard, the app server 100 (or RPPS 305) may use process 600 to verify the integrity of the resource 315, the authenticity of the source (e.g., the 3PS 370), and that the resource 315 is permitted to be served to user systems 12.

Referring now to FIG. 6, process 600 may begin at node 1 where the 3PS 370 may generate a public-private key pair, including public key 605 and private (secret) key 610. The keys 605 and 610 may be used for encrypting/decrypting resource 315 hashes. In one example, the public-private key pair may be an RSA-2048 key pair, where each key comprises 2048 bits (617 decimal digits), and may be generated using suitable Unix utilities. Some other suitable cryptographic key generation mechanism may be used in other embodiments.

At node 2, the 3PS 370 may calculate a cryptographic hash 615 (also referred to as a "hash signature" or the like) using a resource 315 file as an input to a suitable hash function. In one example, the hash function may be an SHA-256 algorithm, and the 3PS 370 may produce a hash 615 having 256 bits using this function. Some other suitable cryptographic hash function may be used in other embodiments. At node 3, the 3PS 370 may generate a digital signature 620 by encrypting the hash 615 using the private key 610. At node 4, the 3PS 370 may generate the manifest 311 to indicate the public key 605, an address of the (unencrypted and unhashed) resource 315, and the digital signature 620. At node 5 the RPPS 305 may obtain the manifest 311 and the resource 315. The manifest 311 and resource 315 may be published and/or accessed as discussed previously.

At node 6, may and may calculate a hash 615X by hashing the obtained resource 315 using the same hashing algorithm used by the 3PS 370 to generate the hash 615. At node 7, the RPPS 305 may decrypt the digital signature 620 using the public key 605 to obtain the hash 615Y. At node 8, the RPPS 305 may compare hash 615X with the hash 615Y. If the two hashes 615X and 615Y do not match, then the resource 315 may have been changed after signing or the digital signature 620 may not have been generated using the private key 610. In this way, the hash 615 calculated from the resource 315 may provide proof of integrity of the resource 315, and the encryption of the hash 615 with the private key 610 may provide proof of authenticity of the identity of the 3PS 370. Nodes 6-8 of process 600 may correspond with operations 530-535 of process 500 depicted by FIG. 5. In some embodiments, the RPPS 305 may store the public key 605 indicated by the manifest 311 in cache 322, and upon additional requests for the resource 315 (or an object 316 referencing or otherwise including the resource 315), the RPPS 305 may ensure that the exported public key 605 matches with the cached version. If the public key 605 is later changed, the RPPS 305 may re-obtain resources 315 and authenticate the resources using the new public key 605 (e.g., by re-performing nodes 5-8).

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. One or more non-transitory computer-readable media (NTCRM) having instructions to cause a computing server, in response to execution of the instructions by a hardware processor of the computing server to provide a resource provider proxy service (RPPS) for a multi-tenant database, to:
   maintain a configuration object having descriptions of one or more domains of one or more third party services (3PS) that are valid for the RPPS to respectively obtain resources of the 3PS for various user systems of various tenants of the multi-tenant database, the descriptions of the one or more domains of the one or more 3PS being consistent with corresponding content security policies (CSP) of the user systems specifying 3PS domains which resources may be consumed by applications of the user systems, the configuration object further including access information for manifests associated with sets of the 3PS resources to be respectively served as single objects to the user systems, and each manifest having metadata of one of the sets of 3PS resources to be served as a single object;
   identify and access a manifest among the manifests for one of the user systems, using the access information of the identified manifest indicated by the configuration object;
   obtain, from one or more of the one or more domains of the one or more 3PS, a set of 3PS resources indicated by the accessed manifest to be served as a single object; and
   serve the single object including the obtained set of 3PS resources, wherein individual resources of the served 3PS resources are executed independently on the one user system from other resources.

2. The NTCRM of claim 1, wherein the RPPS is to:
   navigate to access the manifest the accessed manifest being hosted by the 3PS;
   identify from the accessed manifest a resource name of each resource of the set of 3PS resources to be served as a single object.

3. The NTCRM of claim 2, wherein to obtain the set of 3PS resources from the one or more domains of the one or more 3PS, the RPPS is to:
   obtain, from the one or more domains of the one or more 3PS, each resource having a resource name that matches a resource name indicated by the accessed manifest.

4. The NTCRM of claim 3, wherein the RPPS is to further:
generate, for each obtained 3PS resource, a first hash using a hashing algorithm;
determine, for each obtained 3PS resource, a second hash of a resource signature indicated by the accessed manifest; and
control storage, in a web cache system, of the obtained 3PS resources having a first hash that matches a corresponding second hash.

5. The NTCRM of claim 4, wherein, to determine the second hash, the RPPS is to:
decrypt the resource signature of each obtained 3PS resource using a public key indicated by the accessed manifest.

6. The NTCRM of claim 4, wherein the RPPS is to further:
generate, for the 3PS resources to be stored in the web cache system, a timestamp; and
control storage of the timestamp in the web cache system or in a memory location that is separate from the web cache system.

7. The NTCRM of claim 6, wherein the timestamp is to indicate a time at which the 3PS resources to be stored in the web cache system were obtained from the one or more domains of the one or more 3PS, a time at which the 3PS resources to be stored in the web cache system are verified, or a time at which the 3PS resources to be stored in the web cache system are stored in the web cache system.

8. The NTCRM of claim 5, wherein the RPPS is to further:
determine, prior to serving the single object, whether the set of 3PS resources are stored in the web cache system; and
serve the set of 3PS resources from the web cache system without generating a signature for each 3PS resource when the set of 3PS resources are stored in the web cache system.

9. The NTCRM of claim 1, wherein the RPPS is to further:
receive, from the one user system, a request for the single object;
authenticate the one user system; and
establish a secure encrypted link with the one user system upon proper authentication of the one user system.

10. The NTCRM of claim 1, wherein the RPPS is to further:
generate individual sandboxes for individual resources of the set of 3PS resources; and
generate the single object to include the individual sandboxes.

11. The NTCRM of claim 10, wherein, to generate the individual sandboxes, the RPPS is to further:
generate secure versions of the individual resources.

12. An application server comprising:
a processor system including a hardware processor, and a communication system coupled to the processor system to operate a resource provider proxy service (RPPS) for a multi-tenant database to:
maintain a configuration object having a description of one or more domains of one or more third party services (3PS) that are valid for the RPPS to respectively obtain resources of the 3PS for various user systems of various tenants of the multi-tenant database, the description of the one or more domains of the one or more 3PS being consistent with content security policies (CSP) of the user systems specifying 3PS domains which resources may be consumed by applications of the user systems, the configuration object further including access information for manifests associated with sets of the 3PS resources to be respectively served as single objects to the user systems, and each manifest having metadata of one of the sets of 3PS resources to be served as a single object;
identify 3PS resources that have names that match resource names indicated by the one manifest for one of the user systems;
identify a single object having the identified 3PS resources to be served to the one user system, wherein individual resources of the identified 3PS resources are to be executed or rendered independently on the one user system from other resources;
access the one manifest using an address indicated by the configuration object, the manifest being hosted by a server of one of the one or more third party service (3PS);
obtain, from the one or more domains of the one or more 3PS, the 3PS resources with names matching the resource names indicated by the one manifest; and
serve the single object including the obtained 3PS resources into a sandboxed environment of the one user system, wherein individual resources of the served resources are executed or rendered in a browser or application container on the one user system, independently from other resources.

13. The application server of claim 12, further comprising:
a memory system including a cache system, and wherein the RPPS is to:
generate a first hash using a hashing algorithm for each of the obtained 3PS resources;
determine a second hash for each of the obtained 3PS resources indicated by the manifest; and
control storage, in the cache system, of the 3PS resources having one of the first hashes that matches a corresponding one of the second hashes.

14. The application server of claim 13, wherein, to determine the second hash, the RPPS is to:
identify a resource signature of each of the obtained 3PS resources, the resource signature being indicated by the one manifest;
identify a public key associated with the 3PS, the public key being indicated by the one manifest; and
decrypt the resource signature of each of the obtained 3PS resources using the public key, and decryption of the resource signature is to produce the second hash of each of the obtained 3PS resources.

15. The application server of claim 13, wherein the RPPS is to:
generate a timestamp for each of the 3PS resources to be stored in the cache system; and
control storage of the timestamp in the cache system or in a memory location that is separate from the cache system, wherein the timestamp is to indicate a time at which the 3PS resources to be stored in the web cache system were obtained, a time at which the 3PS resources to be stored in the web cache system are verified, or a time at which the 3PS resources to be stored in the web cache system are stored in the web cache system.

* * * * *